Patented Oct. 17, 1950

2,526,584

UNITED STATES PATENT OFFICE 2,526,584

MANUFACTURE OF SILVER MONO-FLUORIDE

Wilbur J. Shenk, Cleveland, Ohio, assignor to The Harshaw Chemical Company, Cleveland, Ohio, a corporation of Ohio No Drawing. Application June 13, 1947, Serial No. 754,599

6 Claims. (Cl. 23—88)

This invention relates to preparation of silver monofluoride from silver monochloride.

In fluorinating various chlorine containing compounds, AgF is a suitable fluorinating agent. It exchanges a fluorine atom for a chlorine atom so that AgCl is produced. The AgCl can be converted back to AgF by various methods but it obviously would be desirable to accomplish this conversion, with the least possible caking of the bed of fluorinating agent, without deposition of carbon on the AgF produced and without reduction beyond AgF to silver metal.

I have now discovered that the desired results can be accomplished by passing fluorine gas over the bed of finely divided, solid AgCl to convert the same to $AgF_2$ and then reducing the $AgF_2$ to AgF by the use of a suitable reducing gas which is designated below.

My process can be integrated with any vapor phase fluorination reaction wherein AgF is a suitable fluorinating agent and is converted to AgCl. Such fluorination processes do not per se form any part of my invention but merely serve as one field of its utility. I have discovered that the AgCl in finely divided, solid form can be converted to AgF by sequentially passing over such AgCl, first elementary fluorine gas which converts it to $AgF_2$ with very little agglomeration of the particles, and then passing a suitable reducing gas over the resulting $AgF_2$ whereby the latter is reduced to AgF, again with very little agglomeration, without deposition of carbon and without reduction to metallic silver. While there is some agglomeration, the cake formed is porous and friable so that it is easily broken up into granules of desirable size for use in gas phase reactions. If the AgCl still contains some AgF, i. e. is not completely spent, no difficulties are thereby introduced. If the fluorination to $AgF_2$ is incomplete, no harmful effects result. It is necessary, of course, to reduce the $AgF_2$ fairly completely to avoid undesirable reactions in the fluorinating operations. Suitable reducing gases are methane, ethane, propane, ethylene, propylene and compositions essentially consisting of mixtures thereof, including natural gas. These reducing gases do not reduce the $AgF_2$ beyond AgF.

Example

A mixture of finely divided, solid AgCl and finely divided, solid AgF, almost entirely AgCl, was treated by passing over it a stream of gaseous fluorine until there was no further evolution of chlorine gas. The reaction was carried out in an electrically heated nickel tube furnace, 7″ in diameter and holding four nickel trays. The trays were loaded evenly with 4579 g. silver chloride and fluorine gas from a laboratory cell was passed through the furnace at a rate of 3.8 mols per hour (calculated in terms of mols this is 32 mols of AgCl per 3.8 mols of $F_2$ per hour or 1 mol of AgCl per 0.12 mols of $F_2$ per hour). The temperature of the furnace was maintained at 50° C. for the first hour, 75° C. for the second, 100° C. for the next three, 150° C. for the next three and 175° C. for the last eight hours. The end of the reaction was indicated by the failure to obtain a test for chlorine in the exit gases. In this case 53 mols (2015 g.) of fluorine were required to convert 32 mols of silver chloride to argentic fluoride which represents an efficiency with respect to fluorine of about 60%. The fluorine gas was then stopped and natural gas was passed over the resulting solid $AgF_2$ until there was no further evolution of HF. The gas was dried by passing it through three magnesium perchlorate towers, was then passed through the furnace at 200° C. for thirty-one hours and then at 225° C. for thirty hours more. Hydrogen fluoride gas was evolved rapidly during the first several hours of the reaction, more slowly later on. The product was a sintered, friable orange colored solid which weighed 4020 g., 99.2% of theory, and was almost completely soluble in water.

Analysis

Calc'd: Ag. 85.1; F. 14.9; S. 0.0
Found:       84.6;    15.1;   None or trace

When hydrogen was substituted for natural gas, the chief product was metallic silver.

Having thus described my invention, what I claim is:

1. A method of making AgF in the form of a sintered, friable carbon-free product not containing silver metal consisting essentially in passing over finely divided solid AgCl a current of fluorine gas at a gradually increasing temperature not exceeding about 175° C. maximum whereby said AgCl is converted to $AgF_2$ in friable condition and then stopping the flow of fluorine gas and passing over the resulting $AgF_2$ a current of a dried, gaseous reducing agent of the class consisting of methane, ethane, ethylene, propane, propylene and natural gas, until said $AgF_2$ is reduced to AgF.

2. The invention as defined in claim 1 wherein said carbonaceous, gaseous reducing agent is methane.

3. The invention as defined in claim 1 wherein said carbonaceous, gaseous reducing agent is natural gas.

4. A method of making AgF essentially consisting in passing over finely divided, solid AgCl a current of fluorine gas while gradually increasing the temperature within the range from about 50° C. to about 175° C. until the evolution of chlorine has ceased, stopping the flow of fluorine gas and passing dried natural gas over the resulting product at a temperature from 200° C. to 225° C. until the evolution of HF has ceased whereby there is produced a sintered, friable mass of AgF.

5. In a three-step cyclic process for fluorinating chlorides with AgF, the steps of passing over finely divided solid AgCl having AgF admixed therewith a current of fluorine gas at a gradually increasing temperature not exceeding about 175° C. maximum whereby AgCl is converted to a friable mass of $AgF_2$ and then stopping the flow of fluorine gas and passing over the resulting $AgF_2$ a current of a dried gaseous reducing agent of the class consisting of methane, ethane, ethylene, propane, propylene and natural gas in a temperature range in the order of 200 to 225° C., until said $AgF_2$ is reduced to AgF.

6. The invention as defined in claim 4 wherein the fluorine gas is passed over the solid AgCl at the rate of about 0.12 mols of $F_2$ per mol of AgCl per hour.

WILBUR J. SHENK.

REFERENCES CITED

The following references are of record in the file of this patent:

Ruff: Zeitschrift fur Anorganische and Allgemeine Chemie, Band 219, 1934 ed., p. 143–148.

Industrial and Chemical Engineering Chemistry, March 1947, pp. 348 to 354.

"A Comprehensive Treatise on Inorganic and Theoretical Chemistry," by J. W. Mellor, vol. 3, 1923 ed., page 403. Longmans, Green and Co., N. Y., publishers.

Industrial Gases, Greenwood, 1920 ed., pp. 354, 355.

Abstracts of Papers American Chem. Society 110 "meeting" Sept. 9–13, 1946, pp. 26 I, 27 I and 55 I.